(12) United States Patent  
Zeng et al.

(10) Patent No.: US 12,080,098 B2  
(45) Date of Patent: Sep. 3, 2024

(54) METHOD AND DEVICE FOR TRAINING MULTI-TASK RECOGNITION MODEL AND COMPUTER-READABLE STORAGE MEDIUM

(71) Applicant: UBTECH ROBOTICS CORP LTD, Shenzhen (CN)

(72) Inventors: Yusheng Zeng, Shenzhen (CN); Jun Cheng, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 409 days.

(21) Appl. No.: 17/562,963

(22) Filed: Dec. 27, 2021

(65) Prior Publication Data

US 2022/0207913 A1   Jun. 30, 2022

Related U.S. Application Data

(63) Continuation of application No. PCT/CN2020/139615, filed on Dec. 25, 2020.

(51) Int. Cl.
G06V 40/16   (2022.01)
G06T 7/73    (2017.01)

(52) U.S. Cl.
CPC ............. G06V 40/171 (2022.01); G06T 7/73 (2017.01); G06V 40/166 (2022.01)

(58) Field of Classification Search
CPC ........ G06N 3/045; G06N 20/20; G06N 3/098; G06N 3/096; G06V 40/168; G06V 40/16;

(Continued)

(56) References Cited

U.S. PATENT DOCUMENTS

2022/0092297 A1*  3/2022  Gan ................ G06F 18/22

FOREIGN PATENT DOCUMENTS

| CN | 101339607 A | 1/2009 |
| CN | 111027434 A | 4/2020 |
| CN | 111582141 A | 8/2020 |

OTHER PUBLICATIONS

Ghimire, Deepak, and Joonwhoan Lee. "Geometric feature-based facial expression recognition in image sequences using multi-class adaboost and support vector machines." Sensors 13.6 (2013): 7714-7734. (Year: 2013).*

(Continued)

*Primary Examiner* — Vincent Rudolph
*Assistant Examiner* — Raphael Schwartz (57) ABSTRACT

A method for training a multi-task recognition model includes: obtaining a number of sample images, wherein some of the sample images are to provide feature-independent facial attributes, some of the sample images are to provide feature-coupled facial attributes, and some of the sample images are to provide facial attributes of face poses; training an initial feature-sharing model based on a first set of sample images to obtain a first feature-sharing model; training the first feature-sharing model based on the first set of sample images and a second set of sample images to obtain a second feature-sharing model with a loss value less than a preset second threshold; obtaining an initial multi-task recognition model by adding a feature decoupling model to the second feature-sharing model; and training the initial multi-task recognition model based on the sample images to obtain a trained multi-task recognition model.

20 Claims, 5 Drawing Sheets

(58) Field of Classification Search
CPC .. G06V 40/169; G06V 40/171; G06V 40/172; G06V 40/173; G06V 40/174; G06V 40/175; G06V 40/176; G06V 40/178; G06T 2207/30196; G06T 2207/30201
See application file for complete search history.

(56) References Cited

OTHER PUBLICATIONS

Ghosh, Sayantani, and Samir Kumar Bandyopadhyay. "Gender classification and age detection based on human facial features using multi-class SVM." British Journal of Applied Science & Technology 10.4 (2015): 1-15. (Year: 2015).*

Chen, Hsiuao-Ying, Chung-Lin Huang, and Chih-Ming Fu. "Hybrid-boost learning for multi-pose face detection and facial expression recognition." Pattern Recognition 41.3 (2008): 1173-1185. (Year: 2008).*

Nian, Fudong, et al. "Facial attribute recognition with feature decoupling and graph convolutional networks." IEEE Access 7 (2019): 85500-85512. (Year: 2019).*

Torralba, Antonio, Kevin P. Murphy, and William T. Freeman. "Shared features for multiclass object detection." Toward Category-Level Object Recognition (2006): 345-361. (Year: 2006).*

ISR for PCT/CN2020/139615.
Written opinions of ISA for PCT/CN2020/139615.

* cited by examiner

METHOD AND DEVICE FOR TRAINING MULTI-TASK RECOGNITION MODEL AND COMPUTER-READABLE STORAGE MEDIUM

CROSS REFERENCE TO RELATED APPLICATIONS

The present application is a continuation-application of International Application PCT/CN2020/139615, with an international filing date of Dec. 25, 2020, the contents of all of which are hereby incorporated by reference.

BACKGROUND

1. Technical Field

The present disclosure generally relates to image processing technologies, and particularly to a method and a device and for training a multi-task recognition model.

2. Description of Related Art

One common topic in facial attribute detection is age and gender detection and recognition, which are typically performed by two separate models. When it requires to detect gender, age, smile, face image quality, face attractiveness, mask, and glasses, 7 models are used to detect these attributes. One problem with such approach is that the recognition responding time of n tasks is n times the responding time of a single recognition task, and the recognition efficiency is low.

Therefore, there is a need to provide a method and device to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
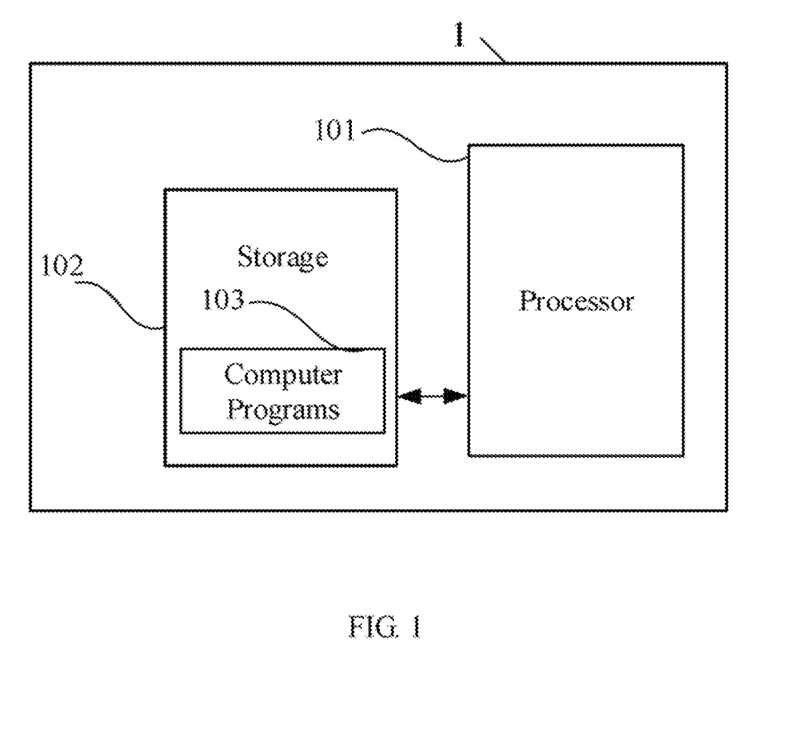
FIG. 1 is a schematic block diagram of a device for training a multi-task model according to one embodiment.
Figure 4:
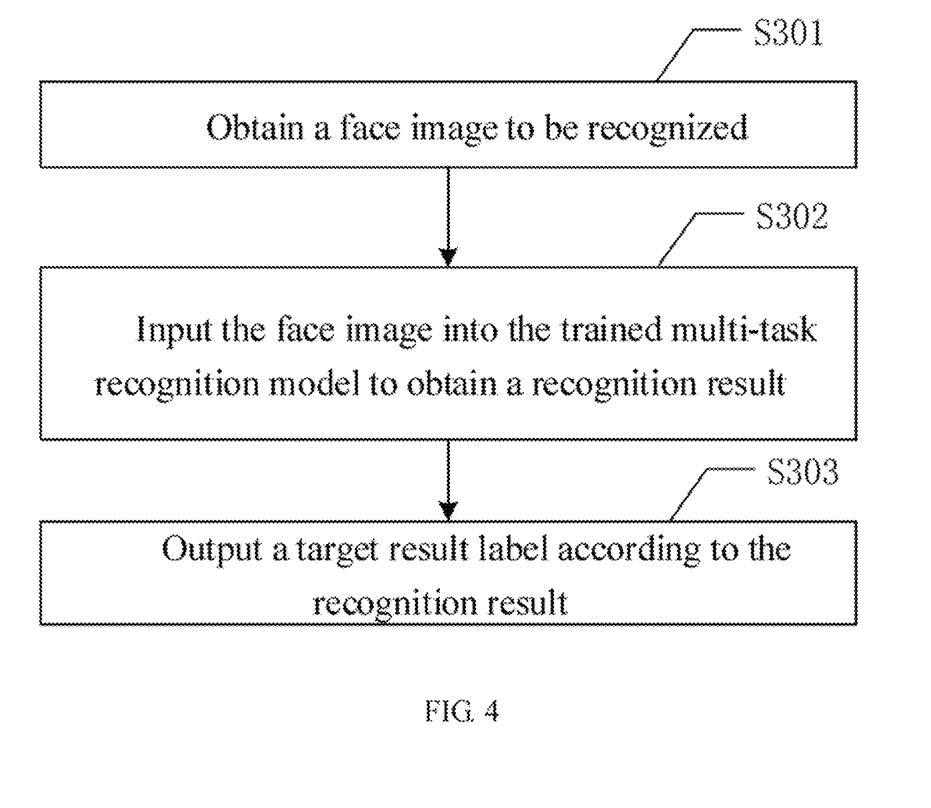
FIG. 4 is a schematic flowchart of a method for training a multi-task model according to one embodiment.

FIG. 1 shows a schematic block diagram of a device 1 for training a multi-task recognition model according to one embodiment. The device 1 may include a processor 101, a storage 102, and one or more executable computer programs 103 that are stored in the storage 102. The processor 101 is electrically connected to the storage 105, and performs corresponding operations by executing the executable computer programs 103 stored in the storage 102. When the processor 101 executes the computer programs 103, the steps in the embodiments of the method for controlling the device 1, such as steps S101 to S105 in FIG. 2 and steps S301 to S303 in FIG. 4 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the device 1, such as a hard disk or a memory. The storage 102 may also be an external storage device of the device 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the device 1. The storage 102 can also be used to temporarily store data that have been output or is about to be output.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 1.

Figure 2:
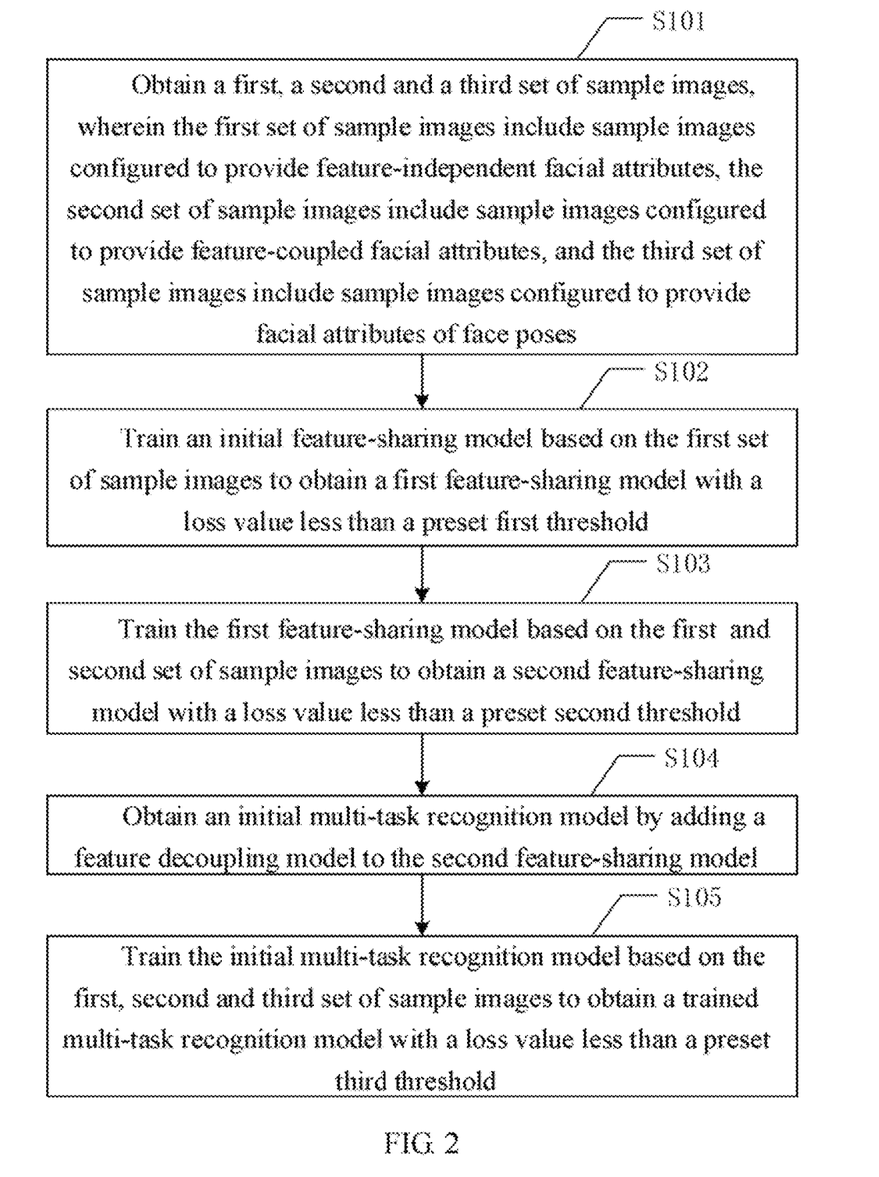
FIG. 2 is a schematic flowchart of a method for training a multi-task model according to one embodiment.

FIG. 2 shows an exemplary flowchart of a method for training a multi-task recognition model according to one embodiment. The method can be implemented to control the device 1 shown in FIG. 1. In one embodiment, the method may include steps S101 to S105.

Step S101: Obtain a first set of sample images, a second set of sample images, and a third set of sample images, wherein the first set of sample images includes a number of sample images that are configured to provide feature-independent facial attributes, the second set of sample images includes a number of sample images that are configured to provide feature-coupled facial attributes, and the third set of sample images includes a number of sample images that are configured to provide facial attributes of face poses.

In one embodiment, these sample images can be obtained by one or more cameras, or from public image libraries. The approach of obtaining these sample images is not limited, and can change according to actual needs.

Multi-task recognition refers to the recognition of multiple attributes of a human face, which can also be referred to as facial attribute recognition. Facial attributes may be facial keypoints, smile, etc.

It should be noted that the feature-independent face attributes are areas where focus areas do not overlap or overlap a little during the training process of face attribute recognition.

For example, in the training process of face attribute recognition, the focus of the "facial keypoints" attribute is the key point area of the face, the focus of "gender" attribute is mainly about hair and facial texture, the focus of "smile" attribute is mainly about mouth and facial texture, the focus of "mask" attribute is about the lower half of the face, and the focus of "glasses" attribute is about the area of glasses. The above-mentioned feature-independent facial attributes are only examples, and do not constitute a limit to the present disclosure.

It should be noted that feature-coupled face attributes are areas where focus areas overlap or overlap greatly during the training process of face attribute recognition. The training result of the face attributes may be unsatisfactory for two feature-coupled attributes because their corresponding areas overlap or overlap greatly.

For example, in the training process of face attribute recognition, the focus of the "age" attribute is a full consideration of multiple face regions such as hair and facial texture. In addition, face image quality, face attractiveness, and face pose are all uncertain face attributes that need to be determined based on multiple regions. Here, the above-mentioned feature-coupled face attributes are only given as examples and do not constitute a limit to the present disclosure.

Step S102: Train an initial feature-sharing model based on the first set of sample images to obtain a first feature-sharing model with a loss value less than a preset first threshold.

Step S103: Train the first feature-sharing model based on the first set of sample images and the second set of sample images to obtain a second feature-sharing model with a loss value less than a preset second threshold.

Step S104: Obtain an initial multi-task recognition model by adding a feature decoupling model to the second feature-sharing model.

Step S105: Train the initial multi-task recognition model based on the first set of sample images, the second set of sample images, and the third set of sample images to obtain a trained multi-task recognition model with a loss value less than a preset third threshold.

The method disclosed in the embodiment of the present disclosure first trains the initial feature-sharing model by using sample images containing several feature-independent face attributes, then trains using sample images containing feature-coupled face attributes, and adds a decoupling model part to the model and trains using sample images containing "face pose" attribute. By gradually increasing the face attributes, the training of the multi-target task recognition model is realized. The method of the present disclosure makes full use of the sample images with feature-independent face attributes to realize feature sharing, and increase the decoupling model to achieve the decoupling effect of the coupled features, which can effectively ensure the recognition accuracy of the multi-task target recognition model, and ensure the recognition efficiency while ensuring the accuracy of single-model recognition of multiple face attributes.

Figure 3:
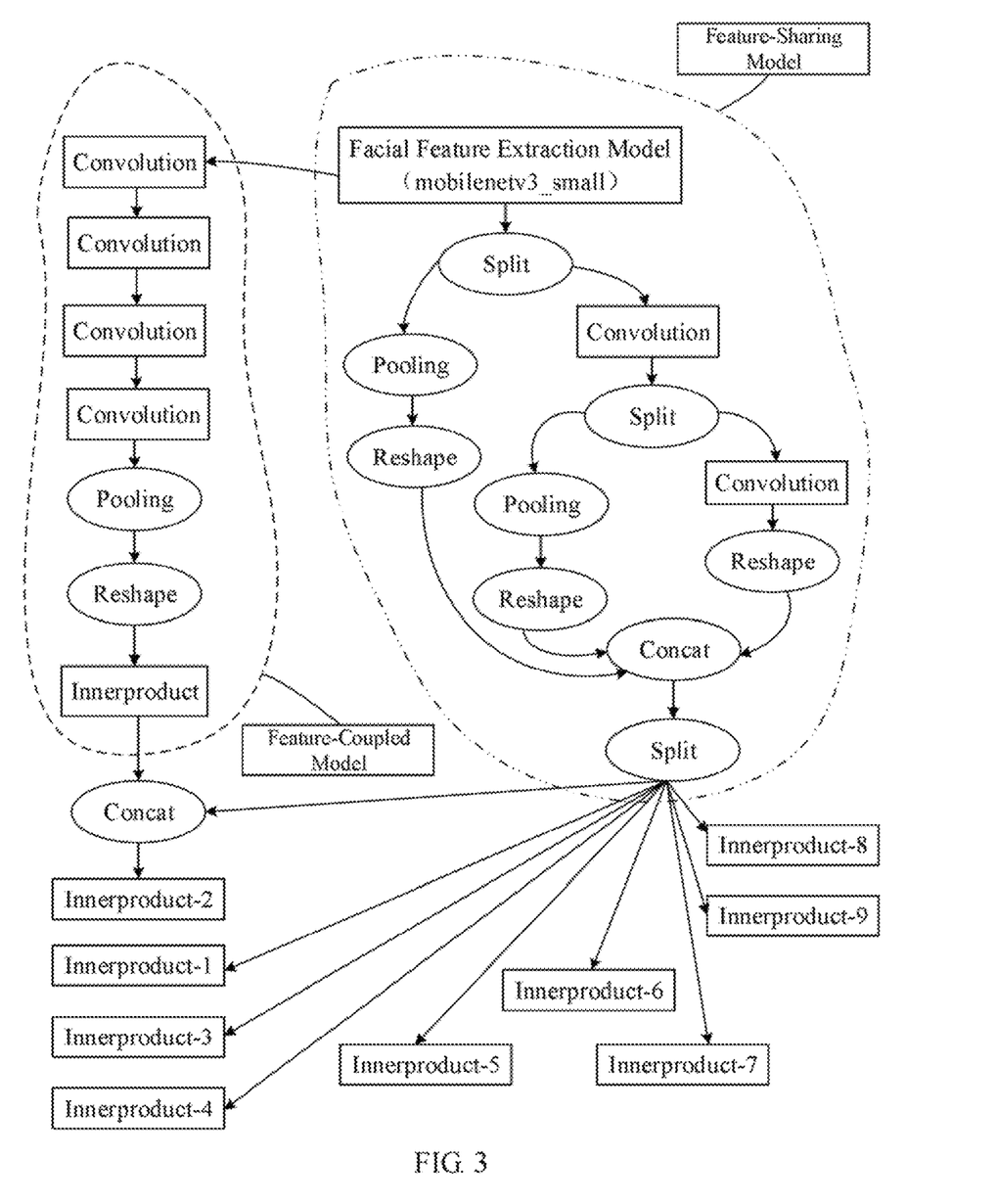
FIG. 3 is a schematic diagram of the structure of a target multi-task recognition model according to one embodiment.

To better understand the embodiment of the present disclosure, please refer to FIG. 3. FIG. 3 is a schematic structural diagram of a target multi-task recognition model of a method for training a multi-task recognition model according to one embodiment.

It should be noted that the model architecture shown in FIG. 3 is based on a mature backbone network which may also be referred to as a backbone model. After extracting facial features, it will be further developed for facial attribute recognition. When choosing backbone, conventional face extraction models are compared.

The mobilenet series and shufflenet series feature extraction networks are the first choices. To balance the recognition rate and effect, the mobile terminal model mobilenetv3_small is selected as the backbone. Combining the deep separable convolution of MobileNetV1, the inverted residual with linear bottleneck of MobileNetV2 and the lightweight attention model based on squeeze and excitation structure of MnasNet, mobilenetv3_small is a strong mobile feature extraction model. Mobilenetv3_small is a lightweight version of mobilenetv3, which has good accuracy and excellent recognition rate.

In one embodiment, mobilenetv3_small is used as the facial feature extraction model in terms of facial feature extraction.

FIG. 3 shows a feature-decoupling model and a feature-sharing model that includes a face extraction model. In the process of training the model, sample images containing several feature-independent face attributes are used to train the initial feature-sharing model to obtain the first feature-sharing model. Sample images containing several feature-coupled face attributes are then added to train the first feature-sharing model, which obtains the second feature-sharing model. Finally, during the training process of the second-sharing model, it is found that the inclusion of face-pose sample images will cause the training result to be unable to be ideal by adjusting the parameters. Therefore, the decoupling model part is added to the second feature-sharing model, and the sample images containing various face poses are added for training the second feature-sharing model, which finally obtains the target multi-task recognition model as shown in FIG. 3.

The convolution module in FIG. 3 is to extract local features from face features. The pooling module in FIG. 3 is also called under-sampling module or down-sampling module. It can be used for feature dimensionality reduction, compressing the amount of data and parameters, reducing overfitting, and improving the fault tolerance of the model. The reshape module in FIG. 3 obtains data in the form of columns when an objective function obtains data for re-layout. The inner product module can be called an inner product layer or a full connection layer. Its main function is to classify the learned features and serve as a "classifier" in the entire convolutional neural network. If operations of the convolutional layer, pooling layer, and activation function layer are to map the original data to the hidden layer feature space, the full connection layer plays the role of mapping the learned "distributed feature representation" to the sample label space. When in actual use, the full connection layer can be realized by a convolution operation: the full connection layer that is fully connected to the previous layer can be converted into a convolution with a 1×1 convolution kernel. The concat module is to connect two or more arrays, and will not change the existing arrays, but will only return a copy of the connected array to return a new array. The split module is to split feature arrays.

FIG. 3 shows nine inner product modules that represent different facial attributes. Specifically, the inner product-1 module represents facial keypoints. The inner product-2 module represents face pose. The inner product-3 module represents age. The inner product-4 module represents face image quality. The inner product-5 module represents smile. The inner product-6 module represents face attractiveness.

The inner product-7 module represents gender. The inner product-8 module represents mask. The inner product-9 represents glasses.

It should be noted that, as shown in FIG. 2, in order for the overall speed of the multi-task recognition model to be fast enough, the feature sharing model is used for training as much as possible when performing multi-task training. When the effect of joint training of one or more attributes is not satisfactory, and the target recognition accuracy cannot be achieved through parameter adjustment, the attribute features are selected for feature splitting, that is, the attribute features are determined as independent branches for training through the feature decoupling model.

In one embodiment, the feature-independent facial attributes may include at least one of facial keypoints, gender, glasses, mask, and smile, and the feature-coupled facial attributes comprise at least one of age, face image quality, and facial attractiveness.

Before the network design, the characteristics of 9 attributes to be identified are first analyzed. Feature-independent attributes include facial keypoints, gender, glasses, mask, and smile. Since the feature-sharing model is suitable for training feature-independent face attributes, an initial feature-sharing model is first built and trained based on the first sample images having the above-mentioned five attributes. By identifying these 5 attributes using the feature-sharing approach, the first-feature sharing model that makes the training accuracy reach more than 95% is obtained.

On the basis of the first feature-sharing model, uncertain coupled features, such as age, face image quality, face attractiveness, and face pose, are added in sample images so as to train the first feature-sharing model based on the feature-independent attributes and the added attributes. It is found that adding the face pose to the feature-independent attributes for joint training has a great impact on the overall training result, while other coupled features (i.e., age, face image quality, and face attractiveness) have little impact on the overall training result. Therefore, in order to balance speed and accuracy, feature sharing is performed on facial keypoints, gender, age, smile, face image quality, face attractiveness, mask, and glasses, and feature splitting is performed on face pose. The training process for the above-mentioned 8 attributes is similar to the training process for the above-mentioned 5 attributes, and will not be repeated here, which finally obtains a second feature-sharing model with an accuracy of more than 95%.

In order to further improve the speed and accuracy, the training of face pose adopts the feature decoupling model training. During the training process, it is found that the prediction of facial keypoints is helpful for the prediction of face pose. Therefore, the recognition results of the feature decoupling model are fused with the recognition results of the facial keypoints of the feature sharing model through the concat module to further obtain more accurate face pose training results. The fusion approach is shown in FIG. 3. Through the concat module, the inner product module output by the feature decoupling model and the split module in the feature sharing model are connected to achieve fusion, which obtains the inner product-2 module (i.e., the face pose recognition result).

The concat module is to connect two or more arrays without changing the existing arrays, but only to return a copy of the connected array to return a new array. In the embodiment, the concat module can further obtain the accurate feature value of the face pose without affecting the prediction of the facial keypoints.

It should be noted that it is found that the difficulty of training for different attributes is different. Therefore, for some relatively simple tasks with independent features, such as mask, glasses, etc., the proportion of sample data should be reduced, and the focus of the sample data is put on the difficult attributes, such as gender, age, etc. Meanwhile, special care should be taken for the attribute recognition of different age groups, that is, samples of each attribute of different age groups are collected, which makes the final training result more ideal. Thus, the distribution of data collection should be collected in a specific proportion according to the difficulty of data identification.

It should be noted that, in one embodiment, the total loss function is set as follows: total_loss=lds_106_loss+pose_loss*1000+age_loss+facequality_loss+facescore_loss+gender_loss*10+glasses_loss*20+mask_loss*20+smile_loss, where lds_106_loss represents the loss function of 106 key points; pose_loss represents the loss function of face pose, and 1000 represents weight coefficient; age_loss represents the loss function of age; facequality_loss represents the loss function of face image quality; facescore_loss represents the loss function of face attractiveness; gender_loss represents the loss function of gender, and the corresponding weight coefficient is 10; glass_loss represents the loss function of glasses, and the corresponding weight coefficient is 20; mask_loss represents the loss function of mask, and the corresponding weight coefficient is 20; and smile_loss represents the loss function of smile.

In one embodiment, a loss value of the facial keypoints on output prediction data of the facial keypoints is calculated using a wingloss loss function in response to there being a task recognition of the facial keypoints.

In one embodiment, a loss value of a first target facial attribute on output prediction data of the first target facial attribute is calculated using an L1 smooth loss function in response to there being a task recognition of the first target facial attribute, and the first target facial attribute include face pose, age, face image quality, smile, facial attractiveness, or face landmark.

In one embodiment, a loss value of a second target facial attribute on output prediction data of the second target facial attribute is calculated using cross entropy as a loss function in response to there being a task recognition of the second target facial attribute, and the second facial attribute comprises gender, mask, or glasses.

The method disclosed in the embodiments of the present disclosure trains a model to obtain a target multi-task recognition model by gradually adding coupled features during the model training process, and realizes the recognition of multiple attributes of a face through a single model, which can ensure the recognition accuracy of multiple attributes by a single model while ensuring recognition efficiency.

Referring to FIG. 4, in one embodiment, the method may further include the following steps.

Step S301: Obtain a face image to be recognized.

The face image to be recognized can be obtained by a camera or in a conventional manner.

Step S302: Input the face image into the trained multi-task recognition model to obtain a recognition result.

In one embodiment, the trained model can be applied to any interactive device or system, which may be a robot or a face recognition system, which is not limited here.

Step S303: Output a target result label according to the recognition result.

The method disclosed in the embodiment of the present disclosure first trains the initial feature-sharing model by using sample images containing several feature-independent face attributes, then trains using sample images containing feature-coupled face attributes, and adds a decoupling model part to the model and trains using sample images containing "face pose" attribute. By gradually increasing the face attributes, the training of the multi-target task recognition model is realized. The method of the present disclosure makes full use of the sample images with feature-independent face attributes to realize feature sharing, and increase the decoupling model to achieve the decoupling effect of the coupled features, which can effectively ensure the recognition accuracy of the multi-task target recognition model, and ensure the recognition efficiency while ensuring the accuracy of single-model recognition of multiple face attributes. As a result, when the model is applied to the interactive terminal for face attribute recognition, the output recognition result is timely, and the interactive experience is improved.

Take the robot as an example to describe the implementation process of the method disclosed in the embodiments above. When the robot's "eyes" detects a human face in the environment, a human face image is obtained by the camera of the robot. The above-mentioned multi-task recognition model is used to recognize the facial features, and a corresponding target result label is output according to the recognition result to execute preset interactive instructions. For example, when the target result label shows that the mask is not worn properly, a voice prompt can be output to achieve interaction. When the target result label shows that the face attractiveness exceeds a preset threshold, a voice message (e.g., "You are so beautiful") can be output. The above-mentioned interaction process can be changed according to actual application scenarios to realize human-machine interaction.

In one embodiment, step S303 may include the following steps: Determine that the target result label is invalid, and output an invalid prompt message in response to a face pose of a human face in the face image is greater than a preset threshold; or determine that the target result label is valid, and output the target result label in response to the face pose of the human face in the face image is less than or equal to the preset threshold.

Figure 5:
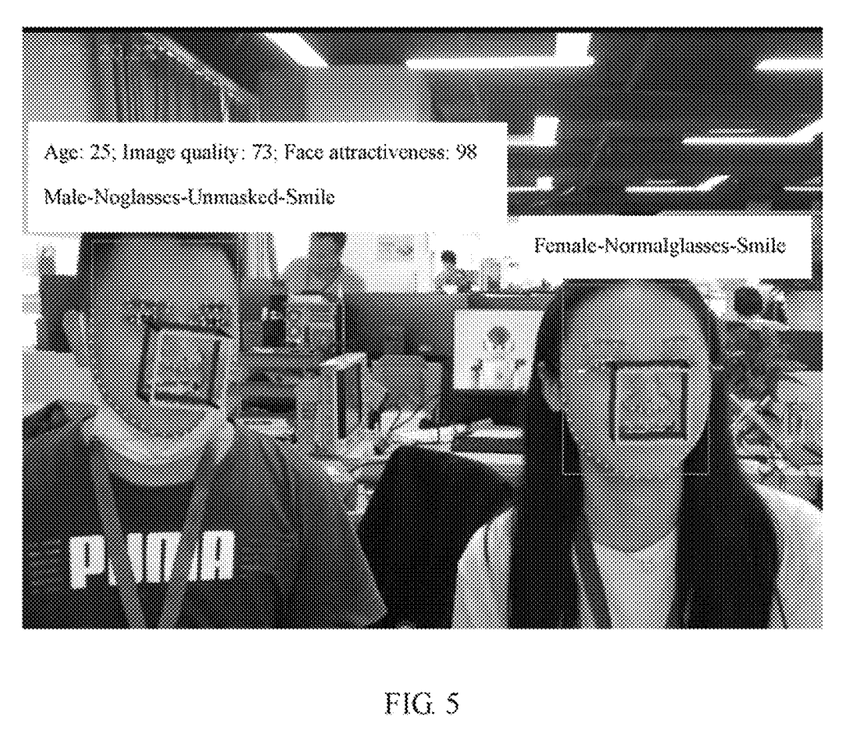
FIG. 5 is a schematic diagram showing an exemplary image with result labels.

FIG. 5 is a schematic diagram of result labels corresponding to human faces according to one embodiment. The three-dimensional cubes shown in FIG. 5 are the corresponding face pose recognition result labels.

The recognition result label of face pose may include a pose angle of the human face, and the pose angle includes a yaw angle, a pitch angle, and a roll angle.

In order to better understand the meaning of the pose angle, the following explanations are made. First, a screen coordinate system or a ground coordinate system is established as follows: Select a point Og on the ground; Create an x-axis in a horizontal plane and the x-axis extends in a certain direction; Create a z-axis that is vertical; Create a y-axis that intersects the x-axis and the z-axis, and the positive direction of the y-axis is determined according to the right-hand rule. Second, a face coordinate system or a head coordinate system is established as follows: Select the center of mass of the human head as origin O; Create an x-axis that points to the right of the head; Create a y-axis that is in the symmetry plane of the human head and points to the top of the head; Create a z-axis that is in the symmetry plane of the human head, perpendicular to the x-axis and the y-axis and points to the back of the human head.

The pose angle is the relationship between the human head coordinate system and the ground coordinate system. The yaw angle is generated by the rotation of the human head coordinate system relative to the ground coordinate system around the y-axis. Similarly, the pitch angle is generated by rotation around the x-axis, and the roll angle is generated by rotation around the z-axis. The yaw angle yaw indicates that the face has turned left or right. The pitch angle indicates that the face has moved up or down. The roll angle indicates that the face has rotated.

It should be noted that, in order to optimize the user experience, when performing face attribute recognition using the multi-task recognition model, no recognition will be performed when the face pose recognition result is greater than a preset threshold. In this case, the recognition of facial attributes is not complete or facial attributes cannot be recognized, which means that the recognition is meaningless. Therefore, the recognition result label of each face attribute is output when the recognition result (i.e., the pose angle) corresponding to the above-mentioned face pose is less than or equal to the preset threshold.

In one embodiment, the preset threshold can be set as follows: The maximum absolute value of the yaw angle is 40 degrees, the maximum absolute value of the pitch angle is 25 degrees, and the sum of the absolute value of the pitch angle, the absolute value of the yaw angle, and the absolute value of the roll angle is equal to 65 degrees.

When the absolute value of the yaw angle is less than or equal to 40 degrees, it means that the head has turned to the left or to the right, or faces forward, which is acceptable for face attribute recognition. Then the recognition result is valid, and the face attribute label corresponding to the recognition result is output. When the absolute value of the pitch angle is less than or equal to 25 degrees, it means that the head has turned up or down, or faces forward, which is acceptable for face attribute recognition. Then the recognition result is valid, and the face attribute label corresponding to the recognition result is output. In order to prevent the deviation of face pose in space, when the sum of the absolute value of the pitch angle, the absolute value of the yaw angle, and the absolute value of the roll angle is less than or equal to 65 degrees, there may be deviations in other directions in the space, such as the lower left side of the face, etc. However, the deviation at this time is acceptable for face attribute recognition. Thus, the recognition result is valid, and the face attribute label corresponding to the recognition result is output.

When the absolute value of the yaw angle is greater than 40 degrees, it means that the head has turned to the left or right, and the face is incomplete. Thus, the recognized face attribute label will not be output to save resources. When the absolute value of the pitch angle is greater than 25 degrees, it means that the head has turned down or up, and the face is incomplete. Thus, the recognized face attribute label will not be output to save resources. In order to prevent the deviation of face pose in space, when the sum of the absolute value of the pitch angle, the absolute value of the yaw angle, and the absolute value of the roll angle is greater than 65 degrees, there may be deviations in other directions in the space, such as the lower left side of the face, etc. Thus, the recognized face attribute label will not be output to save resources.

It should be noted that the threshold values above are just examples, and do not constitute a limit to the present disclosure.

Specifically, when the robot detects that the face pose has a serious deviation, it will not output the recognized face attribute label, and may output a voice message (e.g., "unrecognized").

FIG. 5 shows examples of the target result labels corresponding to the attributes. Specifically, the target result label of facial keypoints is 106 key points. The target result label of face pose is a three-dimensional cube. The target result label of face image quality is FPS of the corresponding face image. The target result label of face attractiveness is represented by a first value. The target result label of age is represented by a second value. The target result label of smile is represented by a third value. The target result label of gender includes "male" and "female". The target result label of mask includes "unmasked", "masked", and "half masked". The target result labels of glasses include "no glasses", "normal glasses", and "sunglasses".

The method according to embodiments of the present disclosure gradually adds coupled features in the model training process to obtain the target multi-task recognition model. The recognition of multiple face attributes can be realized through a single model, which can ensure the accuracy of recognition of multiple attributes by a single model while ensuring the recognition efficiency. As a result, when the model is applied to the interactive terminal for face attribute recognition, the output recognition result is timely, and the interactive experience is improved.

In one embodiment, a system for training a multi-task recognition model includes a processor and a memory, and computer programs are stored in the memory. When the processor executes the computer programs, the processor is caused to perform the following steps: obtaining a first set of sample images, a second set of sample images, and a third set of sample images, wherein the first set of sample images include a number of sample images that are configured to provide feature-independent facial attributes, the second set of sample images include a number of sample images that are configured to provide feature-coupled facial attributes, and the third set of sample images include a number of sample images that are configured to provide facial attributes of face poses; training an initial feature-sharing model based on the first set of sample images to obtain a first feature-sharing model with a loss value less than a preset first threshold; training the first feature-sharing model based on the first set of sample images and the second set of sample images to obtain a second feature-sharing model with a loss value less than a preset second threshold; obtaining an initial multi-task recognition model by adding a feature decoupling model to the second feature-sharing model; and training the initial multi-task recognition model based on the first set of sample images, the second set of sample images, and the third set of sample images to obtain a trained multi-task recognition model with a loss value less than a preset third threshold.

The system disclosed in the embodiment of the present disclosure first trains the initial feature-sharing model by using sample images containing several feature-independent face attributes, then trains using sample images containing feature-coupled face attributes, and adds a decoupling model part to the model and trains using sample images containing "face pose" attribute. By gradually increasing the face attributes, the training of the multi-target task recognition model is realized. The method of the present disclosure makes full use of the sample images with feature-independent face attributes to realize feature sharing, and increase the decoupling model to achieve the decoupling effect of the coupled features, which can effectively ensure the recognition accuracy of the multi-task target recognition model, and ensure the recognition efficiency while ensuring the accuracy of single-model recognition of multiple face attributes.

When the processor executes the computer programs, the processor is caused to perform the following steps: obtaining a face image to be recognized; inputting the face image into the trained multi-task recognition model to obtain a recognition result; and outputting a target result label according to the recognition result.

The system disclosed in the embodiment of the present disclosure first trains the initial feature-sharing model by using sample images containing several feature-independent face attributes, then trains using sample images containing feature-coupled face attributes, and adds a decoupling model part to the model and trains using sample images containing "face pose" attribute. By gradually increasing the face attributes, the training of the multi-target task recognition model is realized. The method of the present disclosure makes full use of the sample images with feature-independent face attributes to realize feature sharing, and increase the decoupling model to achieve the decoupling effect of the coupled features, which can effectively ensure the recognition accuracy of the multi-task target recognition model, and ensure the recognition efficiency while ensuring the accuracy of single-model recognition of multiple face attributes.

For concepts, explanations, and detailed descriptions related to the technical solution provided by this embodiment of the present disclosure, used in the device, refer to descriptions about the content in the foregoing method or other embodiments. Details are not described again herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/ terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for training a multi-task recognition model, comprising:
    obtaining a first set of sample images, a second set of sample images, and a third set of sample images, wherein the first set of sample images comprise a plurality of sample images that are configured to provide feature-independent facial attributes, the second set of sample images comprise a plurality of sample images that are configured to provide feature-coupled facial attributes, and the third set of sample images comprise a plurality of sample images that are configured to provide facial attributes of face poses;
    training an initial feature-sharing model based on the first set of sample images to obtain a first feature-sharing model with a loss value less than a preset first threshold;
    training the first feature-sharing model based on the first set of sample images and the second set of sample images to obtain a second feature-sharing model with a loss value less than a preset second threshold;
    obtaining an initial multi-task recognition model by adding a feature decoupling model to the second feature-sharing model; and
    training the initial multi-task recognition model based on the first set of sample images, the second set of sample images, and the third set of sample images to obtain a trained multi-task recognition model with a loss value less than a preset third threshold.

2. The method of claim 1, wherein the feature-independent facial attributes comprise at least one of facial keypoints, gender, glasses, mask, and smile, and the feature-coupled facial attributes comprise at least one of age, face image quality, and facial attractiveness.

3. The method of claim 2, wherein a loss value of the facial keypoints on output prediction data of the facial keypoints is calculated using a wingloss loss function in response to there being a task recognition of the facial keypoints.

4. The method of claim 2, wherein a loss value of a first target facial attribute on output prediction data of the first target facial attribute is calculated using an L1 smooth loss function in response to there being a task recognition of the first target facial attribute, the first target facial attribute comprises face pose, age, face image quality, smile, or facial attractiveness.

5. The method of claim 2, wherein a loss value of a second target facial attribute on output prediction data of the second target facial attribute is calculated using cross entropy as a loss function in response to there being a task recognition of the second target facial attribute, the second facial attribute comprises gender, mask, or glasses.

6. The method of claim 1 further comprising:
obtaining a face image to be recognized;
inputting the face image into the trained multi-task recognition model to obtain a recognition result; and
outputting a target result label according to the recognition result.

7. The method of claim 6, wherein outputting the target result label according to the recognition result comprises:
determining that the target result label is invalid, and outputting an invalid prompt message in response to a face pose of a human face in the face image being greater than a preset threshold; or
determining that the target result label is valid, and outputting the target result label in response to the face pose of the human face in the face image being less than or equal to the preset threshold.

8. A device for training a multi-task recognition model, comprising:
one or more processors;
a memory; and
one or more programs, wherein the one or more programs are stored in the memory and configured to be executed by the one or more processors, the one or more programs comprise:
instructions for obtaining a first set of sample images, a second set of sample images, and a third set of sample images, wherein the first set of sample images comprise a plurality of sample images that are configured to provide feature-independent facial attributes, the second set of sample images comprise a plurality of sample images that are configured to provide feature-coupled facial attributes, and the third set of sample images comprise a plurality of sample images that are configured to provide facial attributes of face poses;
instructions for training an initial feature-sharing model based on the first set of sample images to obtain a first feature-sharing model with a loss value less than a preset first threshold;
instructions for training the first feature-sharing model based on the first set of sample images and the second set of sample images to obtain a second feature-sharing model with a loss value less than a preset second threshold;
instructions for obtaining an initial multi-task recognition model by adding a feature decoupling model to the second feature-sharing model; and
instructions for training the initial multi-task recognition model based on the first set of sample images, the second set of sample images, and the third set of sample images to obtain a trained multi-task recognition model with a loss value less than a preset third threshold.

9. The device of claim 8, wherein the feature-independent facial attributes comprise at least one of facial keypoints, gender, glasses, mask, and smile, and the feature-coupled facial attributes comprise at least one of age, face image quality, and facial attractiveness.

10. The device of claim 9, wherein a loss value of the facial keypoints on output prediction data of the facial keypoints is calculated using a wingloss loss function in response to there being a task recognition of the facial keypoints.

11. The device of claim 9, wherein a loss value of a first target facial attribute on output prediction data of the first target facial attribute is calculated using an L1 smooth loss function in response to there being a task recognition of the first target facial attribute, the first target facial attribute comprises face pose, age, face image quality, smile, or facial attractiveness.

12. The device of claim 9, wherein a loss value of a second target facial attribute on output prediction data of the second target facial attribute is calculated using cross entropy as a loss function in response to there being a task recognition of the second target facial attribute, the second facial attribute comprises gender, mask, or glasses.

13. The device of claim 8, wherein the one or more programs further comprise:
instructions for obtaining a face image to be recognized;
instructions for inputting the face image into the trained multi-task recognition model to obtain a recognition result; and
instructions for outputting a target result label according to the recognition result.

14. The device of claim 13, wherein instructions for outputting the target result label according to the recognition result comprise:
instructions for determining that the target result label is invalid, and outputting an invalid prompt message in response to a face pose of a human face in the face image being greater than a preset threshold; or
instructions for determining that the target result label is valid, and outputting the target result label in response to the face pose of the human face in the face image being less than or equal to the preset threshold.

15. A non-transitory computer-readable storage medium storing one or more programs to be executed in a device for training a multi-task recognition model, the one or more programs, when being executed by one or more processors of the device, causing the device to perform processing comprising:
obtaining a first set of sample images, a second set of sample images, and a third set of sample images, wherein the first set of sample images comprise a plurality of sample images that are configured to provide feature-independent facial attributes, the second set of sample images comprise a plurality of sample images that are configured to provide feature-coupled facial attributes, and the third set of sample images comprise a plurality of sample images that are configured to provide facial attributes of face poses;
training an initial feature-sharing model based on the first set of sample images to obtain a first feature-sharing model with a loss value less than a preset first threshold;
training the first feature-sharing model based on the first set of sample images and the second set of sample images to obtain a second feature-sharing model with a loss value less than a preset second threshold;
obtaining an initial multi-task recognition model by adding a feature decoupling model to the second feature-sharing model; and
training the initial multi-task recognition model based on the first set of sample images, the second set of sample images, and the third set of sample images to obtain a trained multi-task recognition model with a loss value less than a preset third threshold.

16. The non-transitory computer-readable storage medium of claim 15, wherein the feature-independent facial attributes comprise at least one of facial keypoints, gender, glasses, mask, and smile, and the feature-coupled facial attributes comprise at least one of age, face image quality, and facial attractiveness.

17. The non-transitory computer-readable storage medium of claim 16, wherein a loss value of the facial keypoints on output prediction data of the facial keypoints is calculated using a wingloss loss function in response to there being a task recognition of the facial keypoints.

18. The non-transitory computer-readable storage medium of claim 16, wherein a loss value of a first target facial attribute on output prediction data of the first target facial attribute is calculated using an L1 smooth loss function in response to there being a task recognition of the first target facial attribute, the first target facial attribute comprises face pose, age, face image quality, smile, or facial attractiveness.

19. The non-transitory computer-readable storage medium of claim 16, wherein a loss value of a second target facial attribute on output prediction data of the second target facial attribute is calculated using cross entropy as a loss function in response to there being a task recognition of the second target facial attribute, the second facial attribute comprises gender, mask, or glasses.

20. The non-transitory computer-readable storage medium of claim 15, wherein the one or more programs, when being executed by one or more processors of the device, cause the device to perform processing comprising:
  obtaining a face image to be recognized;
  inputting the face image into the trained multi-task recognition model to obtain a recognition result; and
  outputting a target result label according to the recognition result.

* * * * *